W. R. Malone,
Check Valve.
No. 81,804.     Patented Sep. 1, 1868.

Witnesses:
H. C. Ashkettle
Jno. A. Morgan

Inventor:
W. R. Malone
by
Attorneys.

United States Patent Office.

WILLIAM R. MALONE, OF MASON, WEST VIRGINIA.

Letters Patent No. 81,804, dated September 1, 1868.

---

IMPROVED CHECK-VALVE FOR PUMPS.

---

The Schedule referred to in these Letters Patent and making part of the same.

---

TO ALL WHOM IT MAY CONCERN:

Be it known that I, WILLIAM R. MALONE, of Mason, in the county of Mason, and State of West Virginia, have invented a new and improved Check-Valve for Pumps; and I do hereby declare that the following is a full, clear, and exact description thereof, which will enable others skilled in the art to make and use the same, reference being had to the accompanying drawings, forming part of this specification.

My invention relates to improvements in check-valves for pumps, the object of which is to provide a more simple and effective valve than those now in use.

It consists in providing a hollow tapered seat, having a downward projection for supporting the valve-stem, which is provided with jam-nuts to regulate the amount of lift of the valve, which is seated upon the top of the valve-seat, which latter is arranged to be fitted into a box or cylinder, and secured in the well-tube at any desired point, as will be more fully described on reference to the accompanying drawings, wherein—

Similar letters of reference indicate corresponding parts.

Figure 1:
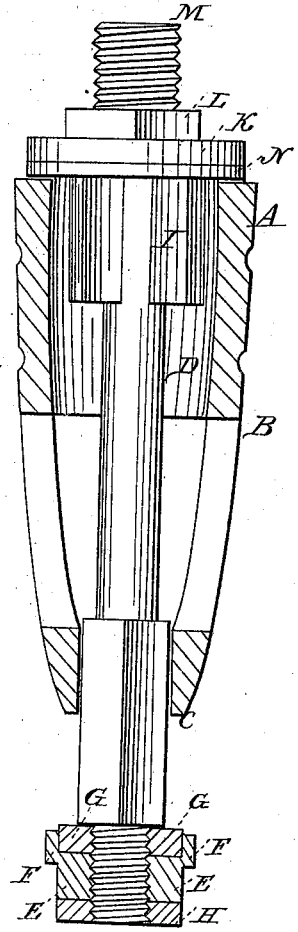
Figure 1 represents a sectional elevation of the same.
Figure 2:
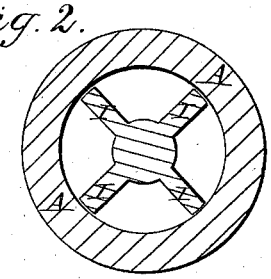
Figure 2 represents a cross-section of the same.

A represents the valve-seat, which is of a slightly conical outward form from the top to the point B, and is arranged to be fitted within a box to be fixed in the well-tube, or, instead of a separate box, a chamber may be provided in the said tube. The prolongation of the seat from the point B to the end C is an irregular taper, each side of which is provided, for a greater portion of the distance, with openings communicating with the bore D of the seat, which, at the lower end, terminates in a synan hole, having straight sides.

D represents a valve-stem, the lower portion of which is made of the right size and shape to fit and work freely in the said square termination of the bore of the seat, and is provided at the end with a nut, E, having a socket, F, which may be filled with elastic packing, G, and is also provided with a jam-nut, H.

The upper portion of the stem is provided with wings, I, to guide the stem, and always maintain it in a central position. Above these wings a valve, K, is fitted, and secured by the nut L. The stem is continued for some distance above the nut L, as shown at M, and provided with a screw-thread whereby a rod, having a corresponding screwed socket, may be connected to draw the check-valve out of its seat in the well-tube, when desired.

The valve K may be provided with a leather, rubber, or any other disk of yielding material on its under face, or it may be ground or otherwise suitably fitted to the seat A, and used without such disk.

The object of the square termination of the bore of the valve, and the square form of the shank or stem fitted therein, is to facilitate the connection of means for drawing the valve and seat out of their position in the well-tube.

In operation, the water is drawn, by the suction of the plunger, in through the side-openings under the valve, which it raises so as to pass the same, which sets back on its seat when the suction ceases, and stops the backward flow, as is well understood.

I claim as new, and desire to secure by Letters Patent—

The valve-seat for check-valves provided with the conical form from A to B, and the taper prolongation provided with the opening in the side and with the square termination of the bore D, in combination with the stem and valve, constructed and arranged substantially as and for the purpose specified.

The above specification of my invention signed by me, this 1st day of April, 1868.

WM. R. MALONE.

Witnesses:
 THOS. W. MALONE,
 D. C. GRAVES.